(12) United States Patent
Gelbart

(10) Patent No.: US 6,191,882 B1
(45) Date of Patent: Feb. 20, 2001

(54) MICROMACHINED LINEAR LIGHT VALVE

(75) Inventor: Daniel Gelbart, Vancouver (CA)

(73) Assignee: Creo SRL, Burnaby (CA)

( * ) Notice: Under 35 U.S.C. 154(b), the term of this patent shall be extended for 0 days.

(21) Appl. No.: 08/934,538

(22) Filed: Sep. 22, 1997

(51) Int. Cl.$^7$ ................................................. G02B 26/00
(52) U.S. Cl. ........................... 359/291; 359/224; 359/298
(58) Field of Search .................................. 359/237, 224, 359/291, 298

(56) References Cited

U.S. PATENT DOCUMENTS

| | | | |
|---|---|---|---|
| 4,956,619 | * 9/1990 | Hornbeck | 330/4.3 |
| 5,061,049 | * 10/1991 | Hornbeck | 359/224 |
| 5,155,778 | * 10/1992 | Magel et al. | 385/18 |
| 5,489,556 | 2/1996 | Li et al. | 437/228 |
| 5,579,149 | 11/1996 | Moret et al. | 359/223 |
| 5,583,669 | 12/1996 | Fushimi et al. | 349/5 |
| 5,774,604 | * 6/1998 | McDonald | 385/18 |

OTHER PUBLICATIONS

Petersen "Micromechanical Light Deflector Array", IBM Technical Disclosure Bulletin, vol. 20, No. 1 Jun. 1977.*
Hartstein "Color Projection System Using Silicon Micromechanics", IBM Technical Disclosure Bulletin, vol. 22, No. 12, May 1980.*
Brooks: "Micromechanical ligh modulators on silicon" Optical Engineering Jan./Feb. 85, vol. 24, No. 1.
Goring et al: "Micro–optical beam deflector and modulators" SPIE vol. 2783, Jun. 1996.
Ching et al: "Microfabricated optical chopper" SPIE vol. 1992, 1993.
Newdeck et al; "Single crystal silicon beams formed by merged epitaxial overgrowth for optical reflectors" SPIE vol. 2383, Feb. 1995.

* cited by examiner

*Primary Examiner*—Georgia Epps
*Assistant Examiner*—Evelyn A. Lester
(74) *Attorney, Agent, or Firm*—Oyen Wiggs Green & Mutala

(57) ABSTRACT

A micromachined linear light valve uses a linear array of cantilevers to stop an array of focused light beams. The response time is fast as the movement of the cantilever has to be about the size of the focused spot, which is below one micron. The focusing optics can be a cylindrical lens, covering the full length of the linear array or an array of aspheric lenslets.

24 Claims, 2 Drawing Sheets

MICROMACHINED LINEAR LIGHT VALVE

FIELD OF THE INVENTION

The invention relates to light valves, which are devices capable of selectively switching multiple light spots at the same time.

BACKGROUND OF THE INVENTION

Light valves, and in particular micromachined light valves, have been known for many years. There are two types of micromachined light valves. The first group are devices operating over a wide range of wavelengths, including white light. These devices typically require a large movement (several microns) of the active micromachined element. This large movement prevents a fast (sub-microsecond) response time. In the second group are devices working on the principle of diffraction gratings. These devices require only sub-micron movements, therefore permitting sub-microsecond response times. Devices in this second group have higher losses and lower contrast ratio than devices of the first group. They are wavelength specific, as the elements move about one quarter of one wavelength. It is an object of this invention to combine fast response time, high optical efficiency, high contrast ratio and a wide range of wavelengths in a single device.

SUMMARY OF THE INVENTION

The invention uses the fact that the diameter of the beam waist of a tightly focused laser beam can be below one micron. If a micromachined cantilever is placed to just cut off the beam at this point, the beam can be permitted to pass by moving the cantilever through distance of less than one micron. In order to get high optical efficiency an array of microlenses is used to break up the illuminating line into an array of spots. Since the spacing between the spots can exceed the spot diameter many times, only a small part of the cantilever width is used. This allows easy micromachining of a cantilever array with large spaces between cantilevers. The invention works particularly well in the U.V. part of the spectrum, as the spot size, therefore the cantilever movement, scales down with the wavelength. For a U.V. light valve, sub-micron cantilever movements are sufficient. Since each one of the cantilevers is individually actuated, typically by electrostatic action between the cantilever and an electrode placed in the air space under it, a multi-channel linear light valve is created.

DESCRIPTION OF THE PREFERRED EMBODIMENT

Figure 1:
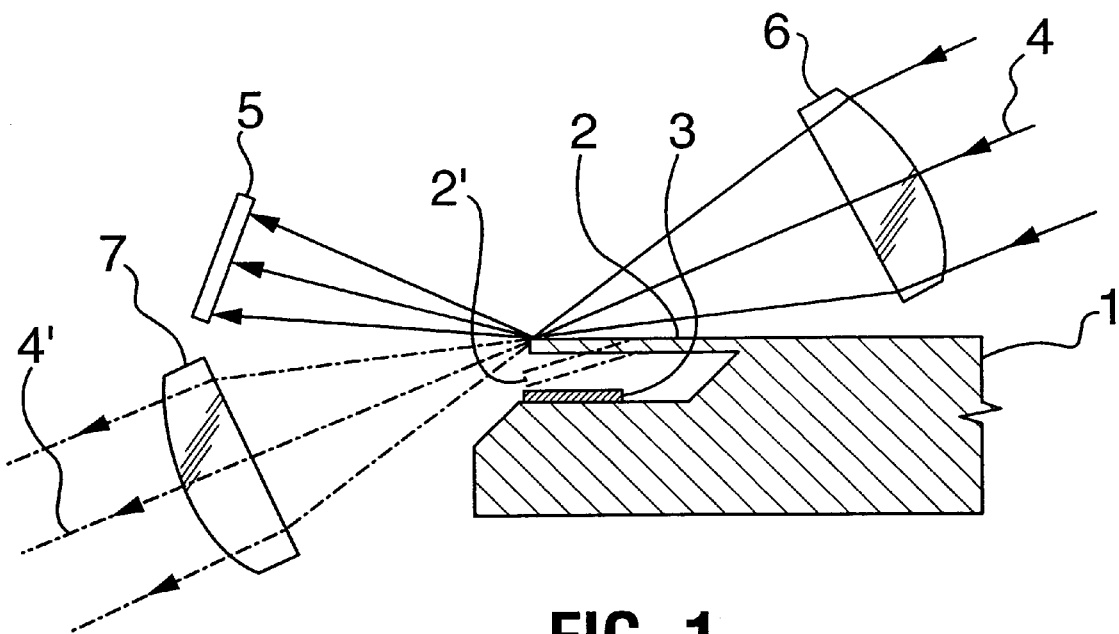
FIG. 1 is a cross section of a micromachined light valve according to the invention.

Referring now to FIG. 1, a linear array of cantilevers 2 are fabricated on a silicon substrate 1 by micromachining. Cantilevers 2 may be described as 'movable elements'. This is a standard procedure in micromachining, available from many suppliers. Details of the fabrication procedure can be found in SPIE volume 2383, pages 146–153 ("Single Crystal Silicon Beams formed by Merged Epitaxial Lateral Overgrowth for Optical Reflectors"). This service is commercially available from specialty semiconductor suppliers such as Center for Microelectronic Systems, Research Triangle Park, N.C.; EG&G IC Sensors, Milpitas, Calif.; Microfabrication Laboratory, Case University, Cleveland, Ohio and others. Since this is a commercially available process no further details will be given.

Cantilever 2 is deflected by applying a voltage to electrode 3, separated from cantilever 2 by an air space of about 1–2 microns. Due to the non-linear nature of the electrostatic force, the action of cantilever 2 is bi-stable. As the voltage is increased, cantilever 2 jumps towards electrode 3. This behavior is well known and used by many micromachined devices, such as the Deformable Mirror Devices (DMD) sold by Texas Instruments. The voltage required to deflect cantilever 3 to the point it jumps and touches electrode 3 is in the range of 5–15 volts. The exact voltage depends on the length and thickness of the cantilever as well as on the air gap. The usual practice is to provide an insulator on top of electrode 3 to act as a "landing pad" for cantilever 2.

Figure 2:
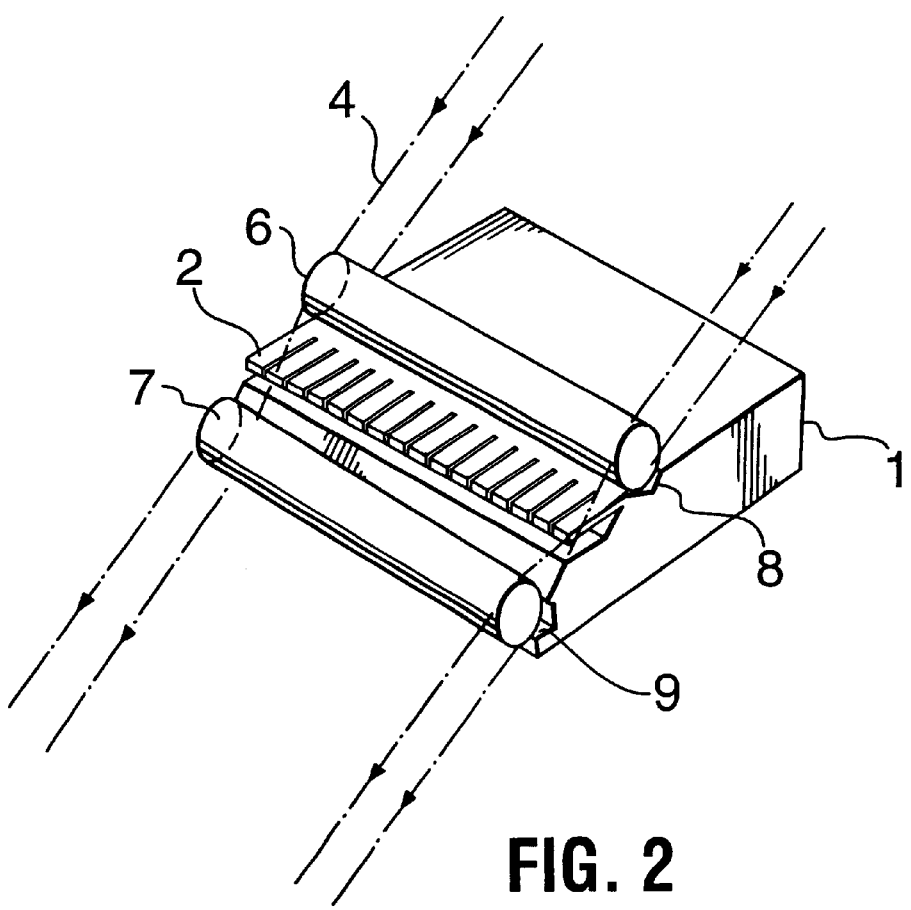
FIG. 2 is a perspective view of an embodiment of the invention having cylindrical lenses.
Figure 3:
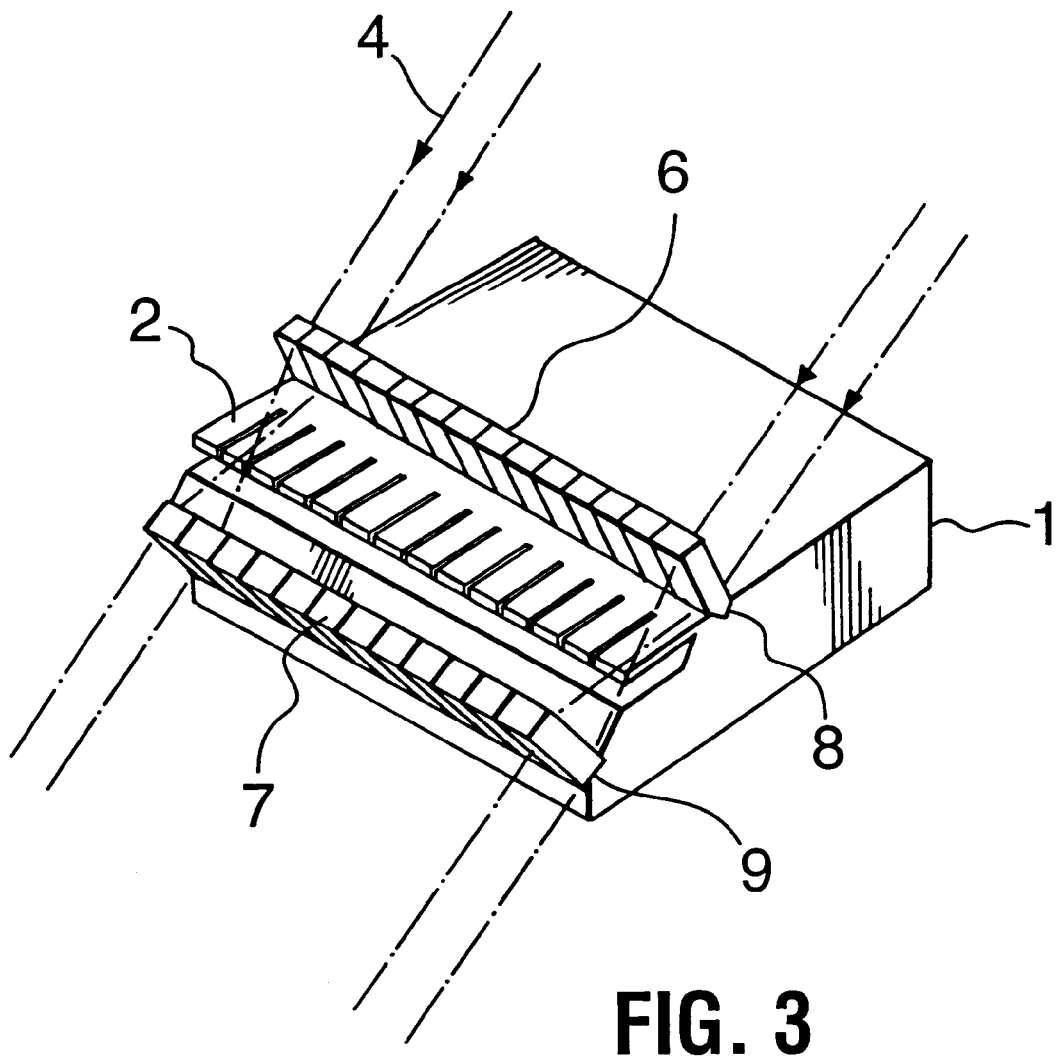
FIG. 3 is a perspective view of an embodiment of the invention having a lenslet array.

While FIG. 1 shows a cross section of a single cantilever, it is obvious that light valves according to the invention will typically have a linear array of cantilevers, as shown in FIG. 2 and FIG. 3. It is also obvious that cantilever 2 has to be electrically insulated from electrode 3. Insulation is achieved by any standard semiconductor process such as the deposition of a dielectric layer ($SiO_2$) under electrode 3 or forming a reverse-biased PN junction between electrode 3 and cantilever 2. While all cantilevers can be joined electrically, the electrode 3 for each cantilever is electrically insulated from other electrodes in order to allow individual addressing of the cantilevers. As the device is made by a semiconductor fabrication process, other electronic functions such as buffers, drivers, mulitplexing, etc., can be integrated on same silicon substrate as the cantilevers. Light beam 4 is focused to a small spot by lens 6. Lens 6 is typically part of a linear lenslet array of high numerical aperture aspheric lenses. In this disclosure the term 'high numerical aperture' means a numerical aperture exceeding about 0.4. Such lenslet arrays are commercially available, for example from LIMO (W. Germany), NSG America (Somerset, N.J.) and Team Technologies (Auburn, Calif.).

Each one of lenses 6 is 10–100 microns in diameter and has a numerical aperture of 0.4–0.7. The spot size it creates is approximately 0.5 microns for U.V. light and about 1 micron for visible and near IR light (spot size being defined to cover over 90% of energy). The tip of cantilever 2 intercepts beam 4 at the waist of the focused beam and reflects the beam to absorber 5. In order to increase reflectivity of cantilever 2 at the wavelength of light beam 4 a thin film reflective coating can be deposited on top of cantilever 2. Typical coatings are aluminum, gold (for IR) or multilayer dielectric coating 5. An alternative is to make cantilever 2 from an etched metal layer deposited on top of the silicon wafer 1.

When cantilever 2 is deflected electrostatically by an electric charge on electrode 3, beam 4 is unobstructed and continues to collecting lens 7, which re-collimates it as beam 4'. The deflected position of cantilever 2 is shown as 2'. Since lens 7 is located to have a common focal point with lens 6, a collimated beam 4 entering lens 6 will emerge as a collimated beam 4' exiting lens 7. Lenses 6 and 7 can have identical or different focal lengths. If the focal lengths of lenses of 6 and 7 are different, fill factor and beam size can be changed. The small spot size created by the high numerical aperture of lens 6 requires only a small movement, in the range of one micron, from cantilever 2 in order to switch beam 4' on or off. This small movement is key to the fast response time, in the order of one microsecond, achievable by the current invention. FIG. 2 shows a linear light valve according to the invention. Incoming wide beam 4 is focused (in one dimension only) by cylindrical lens 6 and re-collimated by second cylindrical lens 7. In order to achieve better focus (and less required motion of cantilevers 2) lenses 6 and 7 each comprise a graded index fiber. The grading of the index greatly reduces the spherical (cylindrical) aberration compared to a simple glass fiber. Graded index fibers made by Doric Optics (Ottawa, Canada) are particularly suitable for this application. Lenses 6 and 7 can be accurately located in reference to the cantilevers by etching grooves 8 and steps 9 to locate lenses. Grooves 8 and steps 9 may be described as 'registration features'. Since the etching is done at the same time as etching of the cantilevers, the lenses are accurately registered to the cantilevers. The advantage of the embodiment shown in FIG. 2 is its simplicity, however, the lost space between cantilevers has to be minimized in order to reduce optical losses. If optical efficiency is more important than simplicity, the embodiment shown in FIG. 3 is preferred. In FIG. 3 the beam 4 is divided into beamlets by a microlens array 6A, also known as a "lenslet array". Lenslet array 6A comprises a plurality of lenslets. Each lenslet focuses the light to a small spot, allowing wider gaps between cantilevers 2 and no light is lossed due to "dead" spaces. A second lenslet array 7A re-collimates the beam. Light trap 5 shown in FIG. 1 is omitted from FIG. 2 and FIG. 3 for clarity but should be used if stray light is to be minimized.

The invention is of particular importance for modulating U.V. light as most common light valves do not operate well in the U.V. Since this is a reflective light valve, and the reflection is done at low incidence angle, very little U.V. light is absorbed in the device. This allows operating at short wavelength such as 248 nm (Excimer Laser) or 266 nm (quadrupled YAG) and high power densities without damaging the light valve. For use of short wave U.V. it is sometimes desirable to replace the lenses with reflective elements. This principle is well known in optics. The reflective elements or lenses may be described as 'optical focussing elements'. Reflective elements can be micromachined on the same substrate as cantilevers. The operation with U.V. light is important as it allows the invention to be used for the direct writing of patterns onto silicon wafers for the making of semiconductor devices. The high degree of parallelism possible allows high data rates. By the way of example, a device comprising 1024 cantilevers on 25 micron centers built according to the invention can be easily fabricated on a 30 nm silicon die. Data rate, assuming 1 microsecond response time, is over 1 Gbit/sec.

What is claimed is:

1. A linear light valve for selectively turning on and off light spots the light valve comprising:
    a rigid substrate comprising a micromachined registration feature;
    a linear array of selectively movable elements attached to the substrate, the selectively movable elements placed in a path of a light beam;
    one or more first optical focussing elements attached to the substrate at positions determined by the registration feature, the first optical focussing elements operative to reduce sizes of portions of the light beam which impinge upon the elements in order to reduce the movement required of the elements to selectively turn parts of the light beam on and off.

2. A linear light valve as claimed in claim 1 wherein the movable elements constitute a linear cantilever array micromachined from silicon, the array comprising a plurality of cantilevers each cantilever movable by electrostatic force.

3. A linear light valve as claimed in claim 1 wherein the first optical focussing elements comprise reflective optical elements.

4. A linear light valve as claimed in claim 3 wherein the reflective optical elements are micromachined on the substrate.

5. A linear light valve as claimed in claim 1 wherein the first optical focussing elements comprise lenses.

6. A linear light valve as claimed in claim 5 wherein the lenses comprise an array of lenselets.

7. A linear light valve as claimed in claim 6 wherein the lenselets comprise high numerical aperture lenselets.

8. A linear light valve as claimed in claim 7 wherein the lenselets have aspheric surfaces.

9. A linear light valve as claimed in claim 1 wherein the first optical focussing elements comprise a cylindrical lens extending parallel to the linear array of selectively movable elements.

10. A linear light valve as claimed in claim 1 wherein the registration feature comprises a groove in the substrate.

11. A linear light valve as claimed in claim 1 wherein the registration feature comprises a step in the substrate.

12. A linear light valve as claimed in claim 1 comprising one or more second optical focussing elements attached to the substrate, the first and second optical focussing elements having common focal points.

13. A linear light valve as claimed in claim 12 wherein the second optical focussing elements are located by a second registration feature micromachined in the substrate.

14. A linear light valve as claimed in claim 13 wherein the second registration feature comprises a groove in the substrate.

15. A linear light valve as claimed in claim 13 wherein the second registration feature comprises a step in the substrate.

16. A linear light valve as claimed in claim 1 wherein the registration feature and the movable elements are both micromachined in the substrate.

17. A light valve for selectively controlling a light beam, the light valve comprising:
    a) a rigid substrate comprising a micromachined registration feature;
    b) a selectively movable element attached to the substrate, the selectively movable element movable between a first position and a second position;
    c) a first optical focussing element on the substrate at a position determined by the registration feature, the first optical focussing element operative to concentrate the light beam onto the selectively movable element when the selectively movable element is in its first position;
    wherein the light beam may be selectively turned on or off by causing the selectively movable element to move between the first and second positions.

18. The light valve of claim 17 wherein the selectively movable element comprises a cantilever micromachined in the substrate.

19. The light valve of claim 18 wherein the first optical focussing element comprises a cylindrical lens.

20. The light valve of claim 18 comprising a second optical focussing element on the substrate, the first and second optical focussing elements having a common focal point.

21. The light valve of claim 20 wherein the second optical focussing element is in a position defined by a second registration feature micromachined in the substrate.

22. A linear light valve comprising:

a rigid substrate comprising a micromachined registration feature;

a linear array of selectively movable elements attached to the substrate, the selectively movable elements each movable between a first position and a second position, the selectively movable elements each interacting with an incident light beam within a region of interaction so as to control a direction of an exiting light beam, wherein the exiting light beam is directed in a first direction when the selectively movable element is in its first position and the exiting light beam is directed in a second direction when the selectively movable element is in its second position; and, one or more first optical focussing elements on the substrate at positions determined by the registration feature, the first optical focussing elements operative to cause light from the incident beam to converge upon the region of interaction.

23. A linear light valve for selectively turning on and off light spots the light valve comprising:

a rigid substrate;

a linear array of selectively movable elements attached to the substrate, the elements located in a oath of a light beam; and, one or more lenses attached to the substrate and used to reduce the size of the portion of the light beam which impinges upon the elements in order to reduce the movement required of the elements to selectively turn parts of the light beam on and off wherein the lenses comprise two cylindrical graded index optical fibers parallel to the linear array, one of the lenses on each side of the linear array.

24. A linear light valve for selectively turning on and off light spots the light valve comprising:

a rigid substrate;

a linear array of selectively movable elements attached to the substrate, the elements located in a path of a light beam; and, one or more lenses attached to the substrate and used to reduce the size of the portion of the light beam which impinges upon the elements in order to reduce the movement required of the elements to selectively turn parts of the light beam on and off wherein lenses comprise two linear lenslet arrays, each lenslet being a high numerical aperture lenslet having an aspheric surface, the lenslet arrays placed parallel to the linear array of movable elements, one lenslet array on each side of the linear array of movable elements.

* * * * *